United States Patent [19]

Scrutchfield et al.

[11] Patent Number: 5,495,646
[45] Date of Patent: Mar. 5, 1996

[54] SEAT BELT COMFORT CLAMP

[75] Inventors: Edward D. Scrutchfield, 2313 Waterfield Dr., Blue Springs, Mo. 64014; Drake L. Koch, Kansas City, Mo.

[73] Assignee: Edward D. Schrutchfield, Blue Springs, Mo.

[21] Appl. No.: 281,068

[22] Filed: Jul. 27, 1994

[51] Int. Cl.⁶ .......................... A44B 11/00; A62B 35/00
[52] U.S. Cl. ................ 24/500; 24/499; 24/501; 297/483
[58] Field of Search .................. 24/500, 501, 498, 24/499, 638; 297/483; 280/808; 188/65.1

[56] References Cited

U.S. PATENT DOCUMENTS

| | | | |
|---|---|---|---|
| 314,549 | 3/1885 | Tucker | 24/499 |
| 923,575 | 6/1909 | Planett | 24/129 D |
| 2,538,509 | 1/1951 | Dorner | 24/499 |
| 2,593,201 | 4/1952 | Saunders | 24/501 |
| 3,090,029 | 5/1963 | Stroebel | 24/500 |
| 3,437,339 | 4/1969 | Starck | 24/501 |
| 4,648,625 | 3/1987 | Lynch | 280/808 |
| 4,726,625 | 2/1988 | Bougher | 297/483 |
| 4,826,250 | 5/1989 | Ibanez | 280/808 |
| 4,987,659 | 1/1991 | Grandis | 24/499 |
| 5,054,815 | 10/1991 | Gavagan | 280/808 |
| 5,058,922 | 10/1991 | Long | 280/808 |
| 5,139,282 | 8/1992 | Mein | 280/808 |
| 5,154,446 | 10/1992 | Blake | 280/808 |
| 5,201,099 | 4/1993 | Campbell | 24/198 |
| 5,308,116 | 5/1994 | Bawisa et al. | 280/808 |

Primary Examiner—Victor N. Sakran
Attorney, Agent, or Firm—Chase & Yakimo

[57] ABSTRACT

A seat belt comfort clamp provides a vehicle occupant protection from injury and enhanced comfort and convenience and includes a clamp assembly having first and second arms and a pivot member. The pivot member defines an axis extending substantially parallel to the seat belt and pivotally couples the first and second arms together. The first arm pivots between an open position and a closed or clamping position. A spring member biases the first arm from its open position to its clamping position. The first and second arms engage opposite sides of the seat belt and secure the seat belt in a comfortable position when the first arm is in its closed position. The second arm includes a guide member for slidably and adjustably coupling the comfort clamp to the seat belt when the first arm is in its open position.

15 Claims, 2 Drawing Sheets

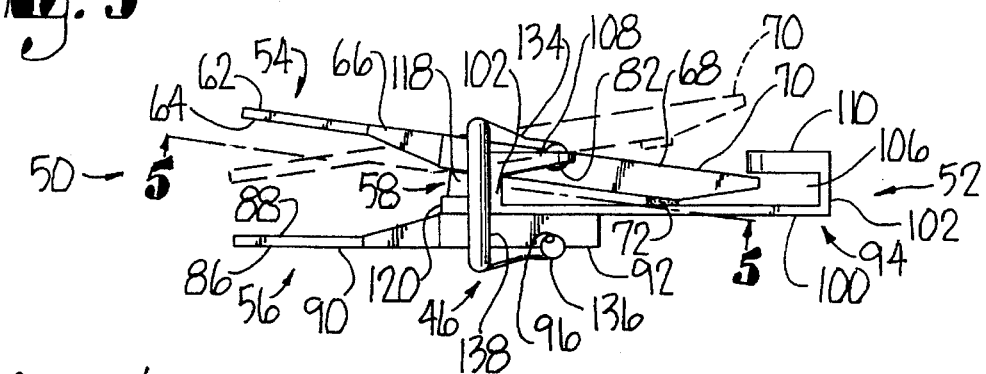
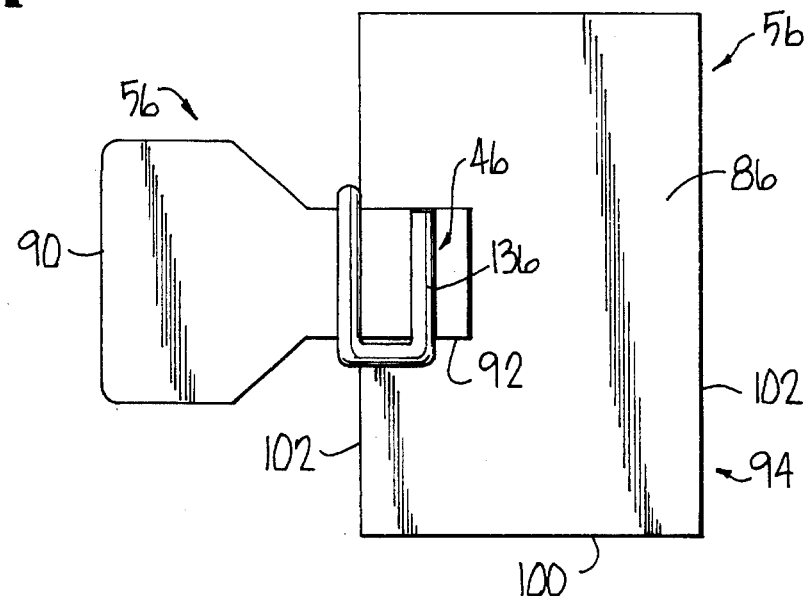
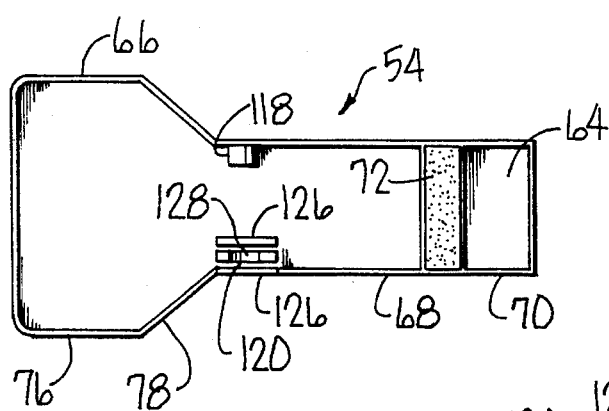
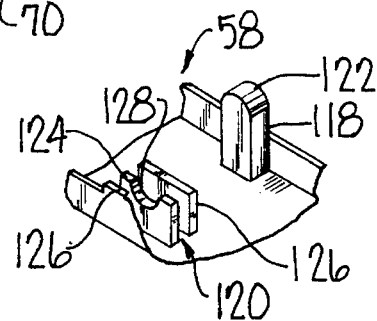

SEAT BELT COMFORT CLAMP

FIELD OF THE INVENTION

This invention relates to a seat belt tension relief device. More particularly, the invention relates to a device for adjusting the shoulder belt or harness of a seat belt system thereby providing the vehicle occupant protection from injury with enhanced comfort and convenience.

BACKGROUND OF THE INVENTION

Motor vehicles are currently required to be equipped with safety belt assemblies for the protection of the vehicle occupants in the event of sudden stops or impact of the vehicle with another vehicle or other object. Typically, these assemblies include a shoulder strap that passes across the chest, neck and shoulder portion of the occupant of the vehicle when the belt is properly fastened. Constant contact of the shoulder strap with the chest, neck and shoulder of the occupant can create discomfort and annoyance to the occupant.

Some devices for attachment to the shoulder strap have previously been proposed in an attempt to deal with these problems but they present several disadvantages. Many cannot be easily removed from the shoulder strap once installed and thus, cannot be easily used with different vehicles. Other devices are not easily adjustable by the occupant. This is an especially important feature for the driver of the vehicle. Some proposed devices do not adequately secure the shoulder strap in the desired position, and permit the shoulder strap to slip into its fully retracted, tightened position around the occupant. Yet other devices are not made from materials strong enough to withstand the extreme temperature conditions within vehicles, especially the heat during summer and cold during winter. Finally, some of these devices include parts that wear out and are not replaceable. Thus, there exists a need in the art for an improved seat belt comfort clamp.

SUMMARY OF THE INVENTION

The seat belt comfort clamp in accordance with the present invention comprises a clamp assembly and a spring member. The clamp assembly includes first and second arms and a pivot means defining an axis extending substantially parallel to the seat belt and pivotally coupling the first and second arms together such that the first arm pivots between an open position and a closed position. The first and second arms are adapted to engage opposite sides of the seat belt and secure the seat belt in a comfortable position when the first arm swings to its closed position under the bias of the spring member. The first arm is provided with a jaw member projecting therefrom for engaging and securing the seat belt between the first and second arms. The second arm includes a specially configured guide member for slidably and adjustably coupling the comfort clamp to the seat belt when the first arm is in its open position.

Accordingly, it is an object of the present invention to provide a seat belt comfort clamp that is easily removable from one shoulder strap and usable with other shoulder straps.

It is another object to provide a seat belt comfort clamp that is easily adjustable by the occupant once situated within the seat of the vehicle.

It is a further object to provide a seat belt comfort clamp that securely holds the shoulder strap in the position desired by the occupant.

It is still a further object of the present invention to provide a seat belt comfort clamp that is light, but yet durable enough to withstand abuse and extreme temperatures.

It is still a further object to provide a seat belt comfort clamp which is easily manufactured from a minimum number of parts.

Finally, it is an object to provide a seat belt comfort clamp that includes replaceable parts.

BRIEF DESCRIPTION OF THE DRAWINGS

FIG. 3 is a side view of the comfort clamp of FIG. 1 showing the first arm pivotal between its open and closed positions, with the seat belt removed for clarity.

FIG. 4 is a bottom view of the second arm of the comfort clamp of FIG. 3.

FIG. 5 is a bottom partial cross-sectional view of the first arm of the comfort clamp of FIG. 3 taken along line 5—5.

FIG. 6 is a detail in perspective of the pivot member extending from one of the arms of the comfort clamp of FIG. 3.

DETAILED DESCRIPTION OF THE PREFERRED EMBODIMENT

Figure 1:
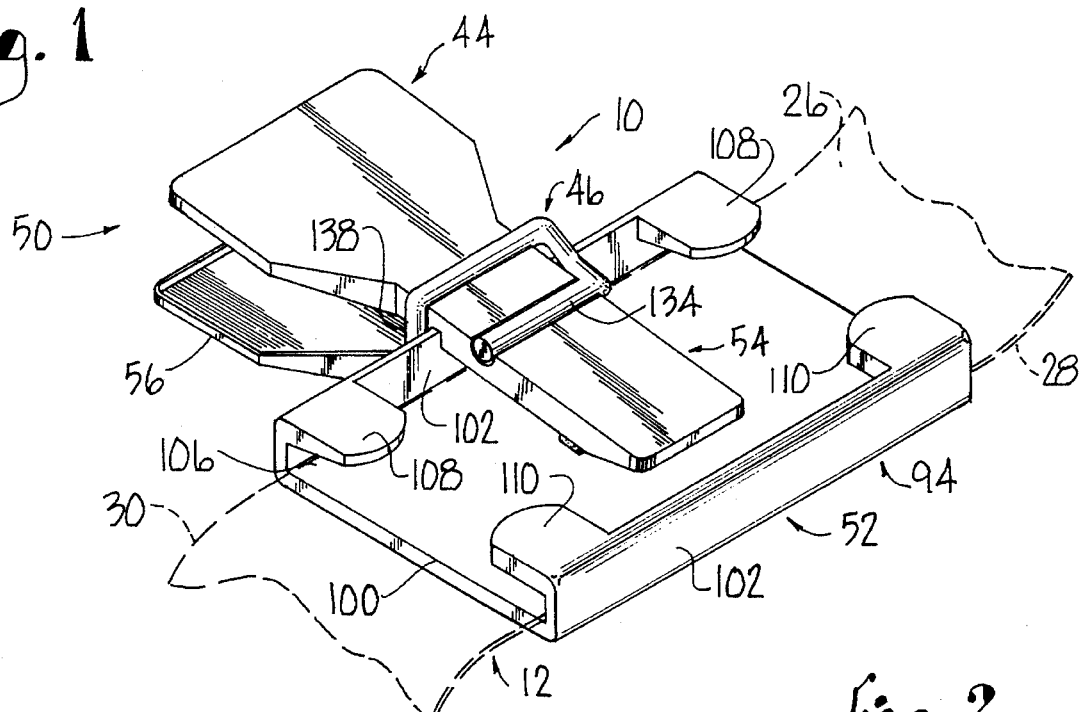
FIG. 1 is a perspective view of the seat belt comfort clamp in accordance with the present invention, showing the clamp securely clamping the shoulder harness of a seat belt.
Figure 2:
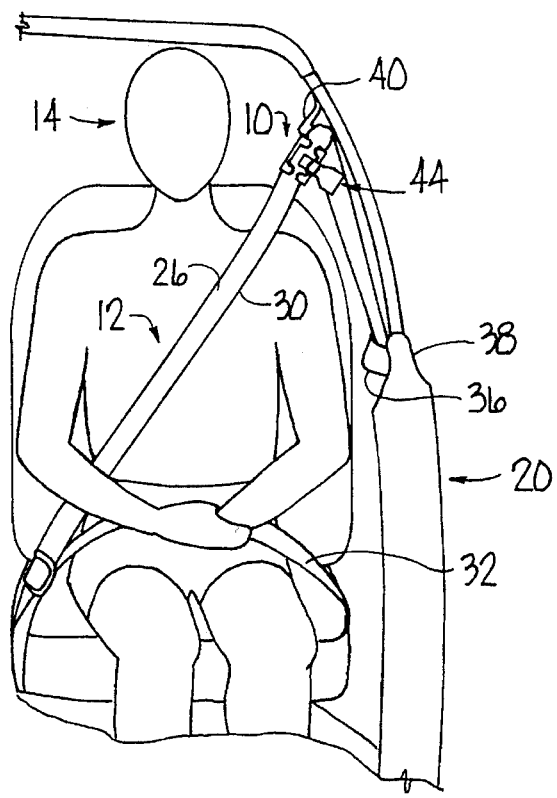
FIG. 2 is a frontal view of an occupant of a vehicle showing the placement of the comfort clamp of FIG. 1 on the shoulder harness worn by the occupant.

As best seen in FIGS. 1 and 2, the seat belt comfort clamp 10 of the present invention securely holds seat belt 12 in the position desired by occupant 14 of vehicle 20. Comfort clamp 10 is slidably adjustable along seat belt 12 for readjustment by occupant 14. Comfort clamp 10 is also easily removable from seat belt 12 for use on other seat belts.

As seen in FIGS. 1 and 2, seat belt 12 is a typical vehicle occupant restraint system. Seat belt 12 is formed of flexible cloth material or strapping and includes top surface 26, bottom surface 28, shoulder harness 30 and lap harness 32. Bottom surface 28 engages occupant 14. Lap harness 32 extends substantially horizontally across the lap of occupant 14. Shoulder harness 30 extends upwardly from within compartment 36, which is mounted on a sidewall 38 of vehicle 20. Shoulder harness 30 then extends through support 40 mounted on sidewall 38 of vehicle 20 and diagonally downwardly across the shoulder and torso of occupant 14, as seen in FIG. 2. During sudden stops or upon impact with another vehicle or object, shoulder harness 30 catches and does not extend, thereby securely protecting occupant 14 from injury. Under normal operating circumstances, the shoulder harness 30 is extendable and retractable into and out of compartment 36 so that shoulder harness 30 conforms to the size of occupant 14. However, when shoulder harness 30 retracts against the torso and shoulder of occupant 14, it can be uncomfortable or annoying to the occupant due to the constant contact of shoulder harness 30 with occupant 14.

Comfort clamp 10 clamps onto shoulder harness 30 of seat belt 12 adjacent support 40, as in FIG. 2. The comfort clamp 10 allows shoulder harness 30 to be adjusted to a comfortable position around the torso and shoulder of occupant 14 and securely holds seat belt 12 in that comfortable position, but still allows seat belt 12 to safely protect occupant 14 from injury.

As seen in FIG. 1, comfort clamp 10 includes clamping assembly 44 and biasing member or spring 46. Clamp assembly 44 includes first end 50, second end 52, first arm 54, second arm 56 and pivot member or axis 58, as seen in FIGS. 1 and 3. First and second arms 54 and 56 each extend between first and second ends 50 and 52. Arms 54 and 56 are preferably each formed integrally and unitarily and are one-piece. Each arm 54 and 56 is also preferably a rigid plastic which withstands extreme heat and cold that can be encountered within vehicle 20 during the summer and winter months. First and second arms 54 and 56 are pivotally coupled together between first and second ends 50 and 52 by pivot member 58.

First arm includes top surface 62, bottom surface 64, handle portion 66, neck portion 68, nose portion 70 and jaw member 72, as best seen in FIGS. 3 and 5. First arm 54 pivots between a first open position, as shown by the broken lines of FIG. 3, and a second closed or clamping position as shown by the solid lines of FIG. 3. A handle 66 extends from first end 50 of clamp assembly 44, toward pivot member 58. Handle 66 includes a rectangular portion 76 and a tapered portion 78. Rectangular portion 76 is formed at first end 50 and extends toward pivot member 58. Both the top and bottom surfaces 62 and 64 of rectangular portion 76 are smooth. Also, rectangular portion 76 is thinner and wider than the other portions of first arm 54. Tapered portion 78 extends from rectangular portion 76 further toward pivot member 58 and tapers inwardly and downwardly so that the width of tapered portion 78 progressively decreases and its thickness progressively increases. Top surface 62 of tapered portion 78 is smooth, but the bottom surface 64 angles outwardly and downwardly.

Neck portion 68 extends from tapered portion 78 of handle 66. Neck portion 68 is the same thickness as the thickest point of tapered portion 78 and the same width as the narrowest point of tapered portion 78. Neck portion 68 extends through pivot member 58 toward second end 52 of clamping assembly 44. Bottom surface 64 of neck portion is smooth, but top surface 62 of neck portion 68 has an arcuate groove 82 extending across its width. Groove 82 receives a portion of biasing member 46 and couples biasing member 46 therein.

Nose portion 70 is also rectangular and extends from neck portion 68 toward second end 52 of clamping assembly 44. Top surface 62 of nose portion 70 is smooth. Bottom surface 64 of nose portion 70 angles upwardly to present a tapered configuration so that nose portion 70 is progressively thinner as it extends toward second end 52.

Jaw member 72 is preferably composed of rubber and is a rectangular insert that may be replaced if it becomes worn. The jaw member 72 extends across the width of bottom surface 64 of neck portion 68 adjacent nose portion 70, and presents a smooth, flat surface which is adapted to engage top surface 26 of shoulder harness 30. Specifically, jaw member engages top surface 26 of shoulder harness 30 when first arm 54 is in its clamping position.

As seen in FIGS. 3 and 4, second arm 56 has a top surface 88, bottom surface 86, handle 90, neck portion 92 and a guide member 94. Second arm 56 is pivotally coupled to first arm 54 such that top surface 88 of second arm 56 faces bottom surface 64 of first arm 54, as seen in FIG. 3. Handle 90 of second arm 56 is identical to handle 66 of first arm 54 and thus, no need exists to discuss it in further detail.

The neck portion 92 of second arm 56 is also very similar to neck portion 68 of first arm 54 and thus, only the differences will be discussed. As seen in FIGS. 3 and 4, neck portion 92 of second arm 56 is shorter than neck portion 68 of first arm 54 and has an arcuate groove 96 for receiving a portion of biasing member 46, just as neck portion 68 of first arm 54 includes groove 82.

Guide member 94 extends from neck portion 92 at pivot member 58 to second end 52 of clamping assembly 44 and continues beyond neck portion 92, as seen in FIG. 4. The guide member 94 slidably and adjustably couples comfort clamp 10 to shoulder harness 30 when first arm 54 is in its open position. Guide member 94 engages bottom surface 28 of shoulder harness 30 when first arm 54 is in its clamping position and thereby cooperates with jaw member 72 of first arm 54 to securely hold shoulder harness 30 in a comfortable position for occupant 14. Guide member 94 includes an elongated base plate 100, opposed longitudinal sidewalls 102, two pairs of corner tabs 108 and 110 lying essentially in a common plane, and a through passageway 106 which extends longitudinally along the upper surface of base plate 100.

As best seen in FIGS. 1, 3 and 4, base plate 100 is rectangular and continuous having a width greater than the width of shoulder harness 30. Sidewalls 102, as best seen in FIG. 3, are parallel, spaced apart and extend perpendicular from the side edges of base plate 100 a distance greater than the thickness of shoulder harness 30.

The corner tabs 108 and 110 extend inwardly from the ends of sidewalls 102 parallel to and spaced apart from base plate 100, as best seen in FIGS. 1 and 3. One tab is located at each end of each sidewall 102 so that the ends of guide member 94 are C-shaped. Each tab 108 and 110 is spaced apart from each of the other tabs 108 and 110, thereby presenting a discontinuous surface and defining a central access opening above the base plate 100. Tabs 108 have a tapered bottom surface, as seen in FIGS. 1 and 3, similar to nose portion 70 of first arm 54 such that the free ends of tabs 108 are thinner than the ends of tabs 108 which are joined to sidewall 102.

Through passageway 106 extends continuously between base plate 100 and tabs 108 and 110 of guide member 94. Passageway 106 is wider than shoulder harness 30 and the height of passageway 106 is greater than the thickness of shoulder harness 30 so that shoulder harness 30 can be slidably adjusted therethrough.

Pivot member or axis 58 pivotally couples first and second arms 54 and 56 together. The pivot member 58 includes pivot fingers 118 and finger cups 120 which extend from the facing surfaces 64 and 88 of the neck portions 68 and 92 of each of the arms 65 and 56. Pivot member 58 is best seen in FIGS. 3, 5 and 6.

One pivot finger 118 and one finger cup 120 are aligned and extend outwardly from each neck portion 68 and 92 of arms 54 and 56, as seen in FIG. 6. Pivot finger 118 extending from first arm 54 is received within finger cup 120 extending from second arm 56. Pivot finger 118 extending from second arm 56 is received within finger cup 120 extending from first arm 54. Pivot fingers 118 each extend outwardly and perpendicularly from arms 54 and 56 an equal distance. Pivot fingers 118 have arcuate free ends 122 which extend into finger cups 120. Otherwise, pivot fingers 118 are rectangular. Finger cups 120 include a main extension 124 and secondary extensions 126. Extensions 124 and 126 are all spaced apart, with main extension 124 between secondary extensions 126. All extensions 124 and 126 extend perpendicularly outwardly the same distance from first and second arms 54 and 56, but main extensions 124 have arcuate notches 128 formed in the ends thereof which receive the arcuate free ends 122 of fingers 118. Secondary extensions 116 engage the sides of fingers 118 and prevent fingers 118 from slipping out of or disengaging arcuate notches 128 of main extensions 124. As shown in FIGS. 5 and 6, pivot fingers 118 and finger cups 120 are immediately adjacent the sides of neck portions 68 and 92 of arms 54 and 56, and are preferably integrally formed with first and second arms 54 and 56.

Biasing member or spring 46 is a one-piece metal spring that forcibly pivots first arm 54 from its open position to its clamping position as illustrated in FIG. 3. Spring 46 thereby fixes first and second arms 54 and 56 in engagement with opposite sides of shoulder harness 30, so that shoulder harness 30 is securely held in a position comfortable for occupant 14. Spring 46 also applies sufficient force on neck portions 68 and 92 of arms 54 and 56 to securely couple arms 54 and 56 together.

As shown in FIGS. 1, 3 and 4 spring 46 preferably has a circular cross-section. Spring 46 includes a first arm portion 144, second arm portion 136 and an interconnecting portion 138. First and second arm portions 134 and 136 are identical, but first arm portion 134 engages top surface 162 of first arm 54 at neck portion 68, and second arm portion 136 engages bottom surface 86 of second arm 56 at neck portion 92. Both arm portions 134 and 136 are C-shaped and each presents a distal end that fits within either groove 82 or groove 96 of first arm 54 or second arm 56, respectively, across the width of neck portion 68 or 92. The interconnecting portion 138 of spring 46 extends perpendicularly between the inner ends of first and second arm portions 134 and 136.

ASSEMBLY AND OPERATION

Arms 54 and 56 of clamping assembly 44 are pivotally coupled together at pivot axis 58. Pivot fingers 118 are inserted within or snap into the finger cups 120 located on the opposite arm 54 or 56 so that the surfaces 64 and 88 of arms 54 and 56 face each other with handles 66 and 90 in alignment.

Spring 46 is inserted around neck portions 68 and 92 of arms 54 and 56 with the distal ends thereof received within grooves 82 and 96, so that interconnecting portion 138 engages and extends along the side of first and second arms 54 and 56 as seen in FIG. 3. If spring 46 eventually fails, it can be removed and replaced with a new spring 46.

The first arm 54 is moved to its open position by vehicle occupant 14 pivoting handle 66 of first arm 54 downwardly toward handle 90 of second arm 56, as shown by the broken lines of FIG. 3. Shoulder harness 30 of seat belt 12 is inserted through the access opening between tabs 108 and 110 and into passageway 106. The taper on nose portion 70 of first arm 54 and tabs 108 facilitates insertion of shoulder harness 30 into guide member 94.

Comfort clamp 10 is slidably adjusted along shoulder harness 30 of seat belt 12 so that it is adjacent shoulder harness support 40. Seat belt 12 is adjusted to a position comfortable for occupant 14 and then handles 66 and 90 are released. Spring 46 forcibly pivots first arm 54 into engagement with top surface 26 of shoulder harness 30 and second arm 56 into engagement with bottom surface 28 of shoulder harness 30. Specifically, jaw member 72 of first arm 54 engages top surface 26 of shoulder harness 30 and base plate 100 of guide member 94 engages bottom surface 28 of shoulder harness 30. The force of spring 46 on arms 54 and 56 fixes jaw member 72 and base plate 100 in secure engagement with shoulder harness 30. Since the comfort clamp 10 is in engagement with shoulder harness support 40, the shoulder harness 30 cannot retract. Thus, shoulder harness 30 is held in the desired comfortable position by comfort clamp 10.

A different occupant having a different sized torso can readjust comfort clamp 10 by pivoting handles 66 and 90 together, which simultaneously pivots first arm 54 to its open position. Comfort clamp 10 can then be adjusted by sliding shoulder harness 30 through passageway 106 of guide member 94.

Comfort clamp 10 can be removed and used with a different seat belt 12 also. Again, handles 66 and 90 are pivoted together to swing first arm 54 to its open position. Shoulder harness 30 can then be removed from guide member 94 by pulling shoulder harness 30 out of passageway 106 through the access opening 112 defined by tabs 108 and 110. Comfort clamp 10 can then be reinserted on a different seat belt 12 as discussed above.

It is to be understood that while certain forms of this invention have been illustrated and described, it is not limited thereto except insofar as such limitations are included in the following claims and allowable equivalents thereof.

Having thus described the invention, what is claimed as new and desired to be secured by Letters Patent is as follows:

1. A seat belt comfort clamp, comprising:

a clamp assembly having first and second arms and pivot means for pivotally coupling said first and second arms together, said pivot means defining an axis extending substantially parallel to the seat belt, and said first arm being pivotal between an open position and a closed position; and a means for biasing said first arm from said open position to said closed position, said first and second arms being adapted to engage opposite sides of the seat belt and secure the seat belt in a comfortable position when said first arm is in said closed position, and said second arm including a guide means for slidably and adjustably coupling the comfort clamp to the seat belt when said first arm is in said open position, said guide means including a first surface and a second discontinuous surface spaced apart from said first surface, said second discontinuous surface being adapted to receive the width of the seat belt therethrough and said first and second surfaces of said guide means slidably and adjustably receiving the seat belt therebetween.

2. A seat belt clamp as claimed in claim 1, wherein said first arm has a jaw member projecting therefrom toward said guide means for engaging and securing the seat belt between said first and second arms.

3. A seat belt clamp as claimed in claim 2, wherein said jaw member is composed of a rubber-like material.

4. A seat belt clamp as claimed in claim 1, wherein said first and second arms include handle portions, said handle portions extending outwardly substantially from said pivot means for pivoting said first arm about said pivot means from said closed position to said open position.

5. A seat belt clamp as claimed in claim 1, wherein said first surface is continuous, said guide means further including a plurality of tabs presenting said discontinuous surface and extending parallel to said first surface and being spaced apart therefrom a distance sufficient for said guide means to slidably receive the thickness of the seat belt.

6. A seat belt clamp as claimed in claim 5, wherein said continuous surface extends parallel to the seat belt;

said tabs are generally coplanar and extend parallel to the seat belt on the opposite side of the seat belt as said continuous surface; and said guide means has an opening between said tabs, the seat belt being insertable through said opening between said tabs.

7. A seat belt clamp as claimed in claim 6, wherein an end of said first arm and at least one of said tabs are tapered to provide for easy insertion of the seat belt through said opening into said guide means.

8. A seat belt clamp as claimed in claim 1, wherein said first arm is unitarily and integrally formed of rigid plastic; and said second arm is unitarily and integrally formed of rigid plastic.

9. A seat belt clamp as claimed in claim 1, wherein said means for biasing includes a metallic spring member.

10. A seat belt clamp as claimed in claim 9, wherein said spring member is removably coupled to said clamp assembly.

11. A seat belt comfort clamp, comprising:

a clamp assembly having a first end, a second end, a first arm, a second arm and a pivot means for pivotally coupling said first and second arms together, said first arm being pivotal between an open position and a closed position; and a spring means coupled to said clamp assembly for forcibly pivoting said first arm from its said open position to its said closed position, said first and second arms being spaced apart at said second end and allowing said clamp assembly to be slidably adjusted along the seat belt when said first arm is in said open position, and said first and second arms securely engaging opposite sides of the seat belt and securing the seat belt in a comfortable position when said first arm is in said closed position, one of said first and second arms including a guide means for slidably and adjustably securing said clamping assembly to the seat belt when said first arm is in said open position, said guide means including a first surface and a second discontinuous surface spaced apart from said first surface, said second discontinuous surface being adapted to receive the width of the seat belt therethrough and said first and second surfaces of said guide means slidably and adjustably receiving the seat belt therebetween, said other arm including a jaw member between said second end and said pivot means which engages and securely holds the seat belt between said jaw member and said first surface of said guide means when said first arm is in said closed position.

12. A seat belt clamp as claimed in claim 11, wherein said first surface is continuous.

13. A seat belt clamp as claimed in claim 12, wherein said pivot means defines an axis extending substantially parallel to the seat belt.

14. A seat belt clamp as claimed in claim 11, wherein said jaw member is composed of a rubber-like material.

15. A seat belt clamp as claimed in claim 11, wherein:

said first arm is integrally and unitarily formed of rigid plastic; and said second arm is integrally and unitarily formed of rigid plastic.

* * * * *